United States Patent [19]

Handa

[11] Patent Number: 5,379,142
[45] Date of Patent: Jan. 3, 1995

[54] DEMULTIPLEXING APPARATUS AND OPTICAL COMMUNICATION SYSTEM USING THE DEMULTIPLEXING APPARATUS

[75] Inventor: Yuichi Handa, Atsugi, Japan

[73] Assignee: Canon Kabushiki Kaisha, Tokyo, Japan

[21] Appl. No.: 170,905

[22] Filed: Dec. 21, 1993

[30] Foreign Application Priority Data

Dec. 25, 1992 [JP] Japan .................................. 4-358126

[51] Int. Cl.$^6$ ............................................. H04J 14/02
[52] U.S. Cl. .................................... 359/129; 359/124; 359/157; 385/24
[58] Field of Search .................... 359/114, 124–125, 359/127, 129, 130, 157, 154, 173; 385/24, 36

[56] References Cited

U.S. PATENT DOCUMENTS 5,074,634 12/1991 Takahashi ............................. 385/24

FOREIGN PATENT DOCUMENTS 0079196 5/1983 European Pat. Off. ............ 359/127

Primary Examiner—Richard E. Chilcot, Jr.
Assistant Examiner—Kinfe-Michael Negash
Attorney, Agent, or Firm—Fitzpatrick, Cella, Harper & Scinto

[57] ABSTRACT

A polarization-independent wavelength demultiplexing apparatus for demultiplexing a light beam of at least one predetermined wavelength, includes a first demultiplexer for demultiplexing the light beam at a predetermined wavelength to obtain a component of the light beam in a first polarization state and second demultiplexer for demultiplexing the light beam at the predetermined wavelength to obtain a component of the light beam in a second polarization state, different from the first polarization state. The first demultiplexer and the second demultiplexer are arranged in a serial manner or in a parallel manner with respect to light transmitted through the demultiplexing structure.

39 Claims, 13 Drawing Sheets

DEMULTIPLEXING APPARATUS AND OPTICAL COMMUNICATION SYSTEM USING THE DEMULTIPLEXING APPARATUS

BACKGROUND OF THE INVENTION

1. Field of the Invention

The present invention relates to a polarization-independent demultiplexing device and an optical communication system, such as a wavelength or frequency division multiplexing communication system, using this demultiplexing device. A stable received output can be obtained, even if the polarization state of an input fluctuates, by an optical device for demultiplexing signals multiplexed in wavelength division multiplexing transmissions or the like.

2. Description of Related Background Art

Conventionally, several kinds of optical devices for demultiplexing wavelength-division multiplexed optical signals have been proposed. Those optical devices are roughly classified into a bulk-type device for demultiplexing optical signals using a device, such as a grating, and a waveguide-type device which includes a basic device, such as a directional coupler. In particular, the degree of freedom in design of the waveguide-type device is greater than that of the bulk-type device, and the wavelength selection function of the waveguide-type demultiplexing device can be controlled. Therefore, the wavelength selection width of the waveguide-type device is narrower than that of the bulk-type device, and hence the wavelength multiplicity of optical transmission can be increased in the waveguide-type device. Further, the center selection wavelength of the waveguide-type device, such as a distributed feedback (DFB)-laser diode (LD) filter, can be readily controlled, and thus the tunability characteristic of the waveguide-type device can be effectively utilized.

However, in the waveguide-type device, the polarization dependency of device performances (i.e., a difference between performances for TE (transverse electric) and TM (transverse magnetic) modes) is strong. Therefore, in optical fiber transmissions, the output of demultiplexed light from the waveguide-type demultiplexing device, which is obtained after light transmission through an optical fiber, fluctuates largely due to fluctuation in the polarization state of the light input into a receiver device. Thus, the light transmission characteristic is unstable. As shown FIG. 1, when a light wave 102 at wavelength $\lambda_1$ is demultiplexed from a light input 101, which contains a component of wavelength $\lambda_1$ and a component of wavelength $\lambda_2$, by a waveguide-type demultiplexing device 100, that is a device having characteristics for demultiplexing a light wave of wavelength $\lambda_1$, in a TE state, a component of wavelength $\lambda_1$ is also mixed into an output 103 of the waveguide-type demultiplexing device 100 and the demultiplexed output 102 fluctuates if the polarization state of the component at wavelength $\lambda_1$ in the light input 101 varies.

To solve that problem, there is a method in which the light wave transmitted through the optical fiber is caused to be transmitted through a polarization control device 110 before being input into the waveguide-type demultiplexing device 100, as shown in FIG. 2, to control its polarization state (TE or TM) as desired. In this connection, reference should be made to a component of wave length $\lambda_1$ in an output 111, which has been converted to the TE state. Thus, the light wave can be stably demultiplexed into two wavelength-component outputs 112 and 113 by the waveguide-type demultiplexing device 100. In the case where the polarization control device 110 is used, however, means for adjusting the light wave to an optimum polarization state in accordance with fluctuation in the light transmission line, such as an optical fiber, is needed (i.e., a polarization diversity function or the like is required), and the resulting structure becomes quite complicated. Furthermore, in the case of wavelength division multiplexed signals, input polarization states of respective wavelength components vary when the multiplexed signals are transmitted through the optical fiber and input into a receiver unit, so the polarization control device 110 should be separately prepared for the respective multiplexed wavelengths. Thus, the number of components and insertion loss increase.

SUMMARY OF THE INVENTION

It is an object of the present invention to overcome the problems of the prior art.

It is an object of the present invention to provide a polarization-independent wavelength demultiplexing apparatus in which a stable demultiplexed light output can always be obtained irrespective of fluctuations in the polarization state of an input light beam, and an optical communication system, such as a wavelength or frequency division multiplexing communication system, using such a polarization-independent wavelength demultiplexing apparatus.

According to one aspect of the present invention which achieves these objectives relates to a wavelength demultiplexing apparatus for demultiplexing a light beam of at least one predetermined wavelength. The apparatus includes first demultiplexing means for demultiplexing the light beam at a predetermined wavelength to obtain a component of the light beam in a first polarization state, and second demultiplexing means for demultiplexing the light beam at the predetermined wavelength to obtain a component of the light beam in a second polarization state, which is different from the first polarization state. The second demultiplexing means is optically connected to the first demultiplexing means in a serial manner with respect to light transmitted through the first demultiplexing means.

The first demultiplexing means and the second demultiplexing means may also be arranged in a parallel manner with respect to light transmitted through the first and second demultiplexing means.

The apparatus can also include input means for inputting a light beam into at least one of the first demultiplexing means, and the second demultiplexing means The orientation of the component of the light beam in the first polarization state is perpendicular to the orientation of the component of the light beam in the second polarization state. The apparatus may also include polarization branching means for causing the light beam from the input means to branch into the first and second demultiplexing means, wherein the light beam in each branch has components in the first and second polarization states.

The apparatus can also include multiplexing means for multiplexing the component of the light beam obtained by the first demultiplexing means and the component of the light beam obtained by the second demultiplexing means. The multiplexing means includes a polarization multiplexing device for multiplexing components of the light beam in mutually perpendicular polarization states. The polarization multiplexing device includes one of a polarization beam splitter and a polarization beam prism. In addition, the apparatus can further include a photodetector for detecting at least part of the light multiplexed by the multiplexing means.

The present invention also includes combining means for combining the component of the light beam obtained by the first demultiplexing means and the component of the light beam obtained by the second demultiplexing means, and a photodetector for detecting at least part of the light combined by the combining means.

The first polarization state obtained by the first demultiplexing means is a transverse electric mode and the second polarization state obtained by the second demultiplexing means is a transverse magnetic mode.

The first and second demultiplexing means respectively comprise waveguide-type demultiplexers comprising polarization-independent wavelength demultiplexing devices, directional coupler devices, grating compensation-type directional coupler devices, and/or waveguide-type deflection grating devices.

The first demultiplexing means can comprise a plurality of first demultiplexing means, and the second demultiplexing means can comprise a plurality of second demultiplexing means. The plurality of the first and second demultiplexing means are serially arranged with respect to light transmitted through the plurality of the first demultiplexing means and the plurality of the second demultiplexing means.

According to another aspect, the present invention which achieves these objectives relates to a wavelength division multiplexing communication system for performing wavelength division multiplexing transmission through an optical fiber. The system includes a transmitter unit and a receiver unit. The receiver unit includes a wavelength demultiplexing apparatus for demultiplexing a light beam of at least one predetermined wavelength. The wavelength demultiplexing apparatus includes first demultiplexing means for demultiplexing the light beam at a predetermined wavelength to obtain a component of the light beam in a first polarization state, and second demultiplexing means for demultiplexing the light beam at the predetermined wavelength to obtain a component of the light beam in a second polarization state, different from the first polarization state. The second demultiplexing means is optically connected to the first demultiplexing means in a serial manner with respect to light transmitted through the first demultiplexing means. In another embodiment, the first demultiplexing means and the second demultiplexing means are arranged in a parallel manner with respect to light transmitted through the first and second demultiplexing means.

According to another aspect of the present invention which achieves these objectives relates to a wavelength demultiplexing apparatus for demultiplexing a light beam of at least one predetermined wavelength. The apparatus includes first demultiplexing means for demultiplexing the light beam at a predetermined wavelength to obtain a component of the light beam in a first polarization state, and second demultiplexing means for demultiplexing the light beam at the predetermined wavelength to obtain a component of the light beam in a second polarization state, different from the first polarization state.

These and other objects, features, and advantages of the present invention will become more apparent upon consideration of the following detailed description of the preferred embodiments when read in conjunction with the attached drawings.

DESCRIPTION OF THE PREFERRED EMBODIMENTS

First Embodiment

A first embodiment of a demultiplexing device according to the present invention will be described with reference to FIGS. 3 and 4.

Figure 1:
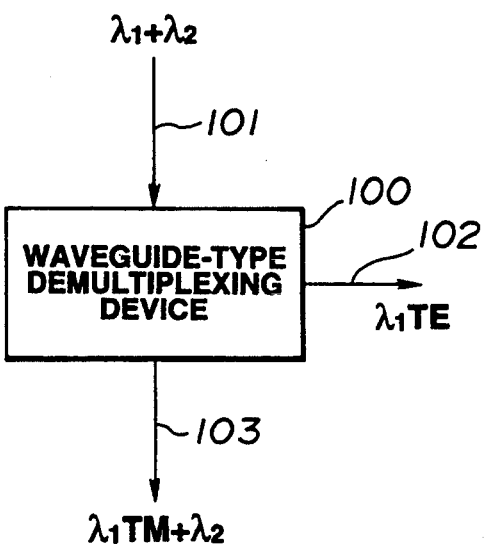
FIG. 1 is a block diagram illustrating a conventional polarization-dependent wavelength demultiplexer.
Figure 2:
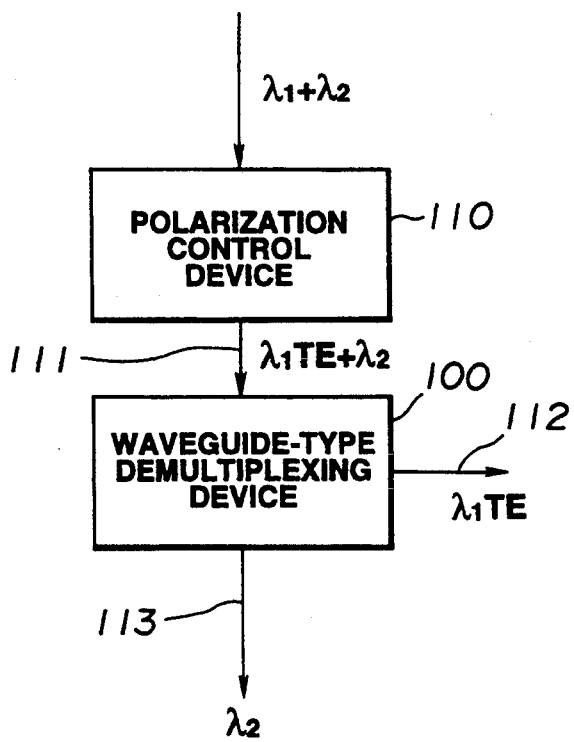
FIG. 2 is a block diagram illustrating a combination of a polarization control device and a conventional polarization-dependent wavelength demultiplexer.
Figure 3:
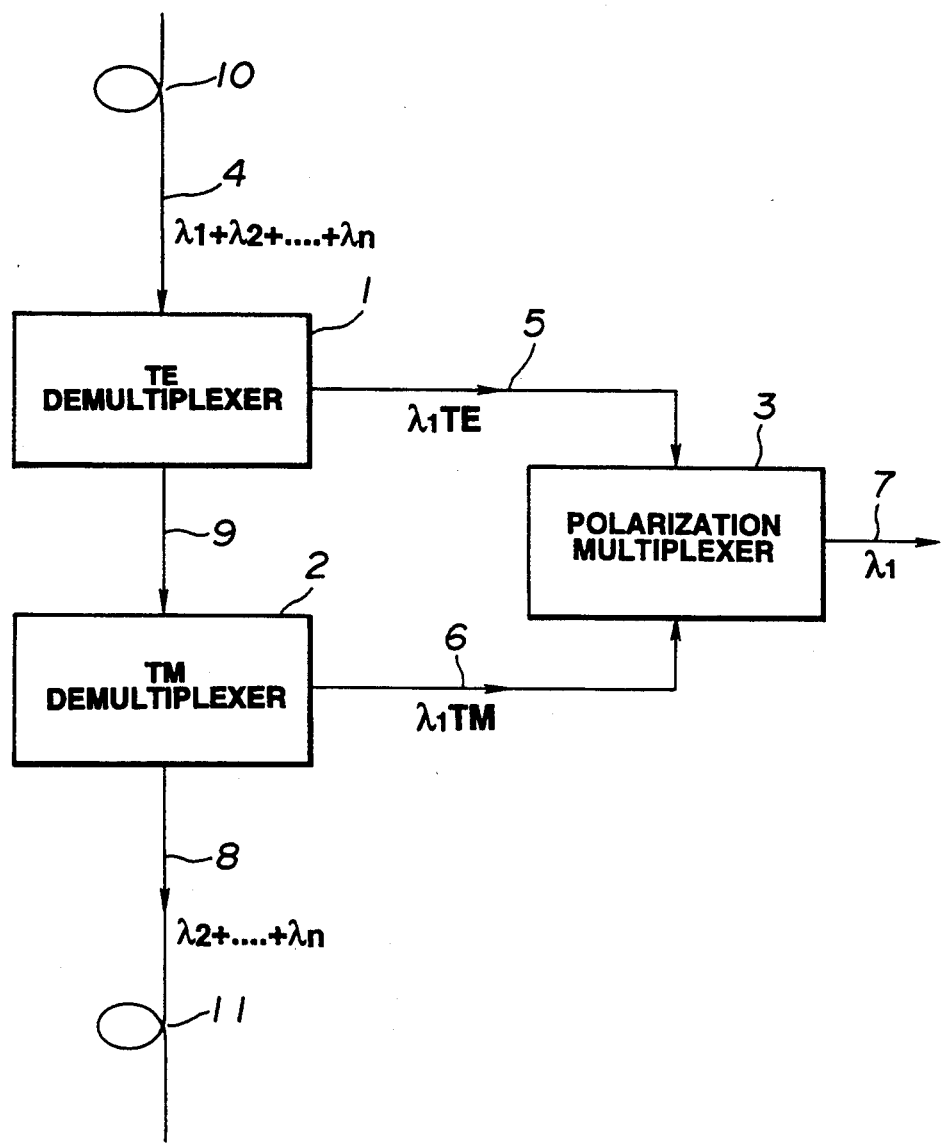
FIG. 3 is a block diagram illustrating a first fundamental concept of the present invention (a multi-stage or serial system).

FIG. 3 shows a first fundamental construction of a polarization-independent demultiplexing device of the present invention. In the structure, a certain predetermined wavelength $\lambda_1$ of wavelength multiplexed input is, for example, demultiplexed. In FIG. 3, reference numeral 1 designates a demultiplexer for demultiplexing a selection wavelength $\lambda_1$ in a TE polarization state, reference numeral 2 designates a demultiplexer for demultiplexing a selection wavelength $\lambda_1$ in a TM polarization state, and reference numeral 3 designates a polarization multiplexer for multiplexing light waves in TE and TM polarization states.

The operation of that device will be described. Input light beam 4 comprising wavelength multiplexed signals having wavelengths $\lambda_1, \lambda_2, \ldots, \lambda_n$ (n being a positive integer) are transmitted through an optical fiber 10 and input into the device in an unstable polarization state. In the first-stage TE demultiplexer 1, a TE mode component, which is one polarization state, is demultiplexed at a desired selection wavelength $\lambda_1$, (see $\lambda_1$TE demultiplexed light beam 5). Then, the second-stage TM demultiplexer 2 demultiplexes a TM mode component, which is perpendicular to the polarization state demultiplexed in the first-stage TE demultiplexer 1, at the selection wavelength $\lambda_1$ (see $\lambda_1$TM demultiplexed light beam 6). Here, it is important that the polarization state of a transmission light beam 9 into the second-stage TM demultiplexer 2 remains unchanged during the transmission between the demultiplexers 1 and 2. The $\lambda_1$TE demultiplexed light beam 5 and the $\lambda_1$TM demultiplexed light beam 6 are multiplexed by the polarization multiplexer 3, and thus an output light beam 7 at wavelength $\lambda_1$, which is a desired wavelength component of the input light beam 4, can be obtained. The last-stage polarization multiplexer 3 may be replaced by a simple combining device to simplify the whole construction. A remaining output light beam 8 output from the second-stage TM demultiplexer 2 is input into an optical fiber 11.

The first embodiment is constructed based on the first fundamental structure shown in FIG. 3, using a waveguide device. In FIG. 4, reference numerals 21 and 22 designate directional coupler-type demultiplexing devices (hereinafter referred to as demultiplexer devices) which, respectively, have two stripe-shaped, channel-type waveguides 21a and 21b; 22a and 22b (hereinafter referred to as waveguides). The waveguides may be any one of buried-type, strip-type, rib-type and the like. The demultiplexing devices 21 and 22, respectively, have demultiplexing functions for demultiplexing TE and TM mode components at a predetermined wavelength which is, for example, $\lambda_1$ and referred to as a selection or demultiplexed wavelength. In those demultiplexing devices 21 and 22, other non-selected wavelengths (for example, $\lambda_2, \lambda_3, \ldots, \lambda_n$) are transmitted therethrough without any change, are not effectively demultiplexed therein, and there is little crosstalk. The polarization components 25 ($\lambda_1$TE) and 26 ($\lambda_1$TM), which are demultiplexed at wavelength $\lambda_1$ and perpendicular to each other, are multiplexed with low loss by a polarization beam splitter 23 or a polarization beam prism which is used as a polarization multiplexing device. Thus, a demultiplexed output light beam 27 can be obtained.

Figure 4:
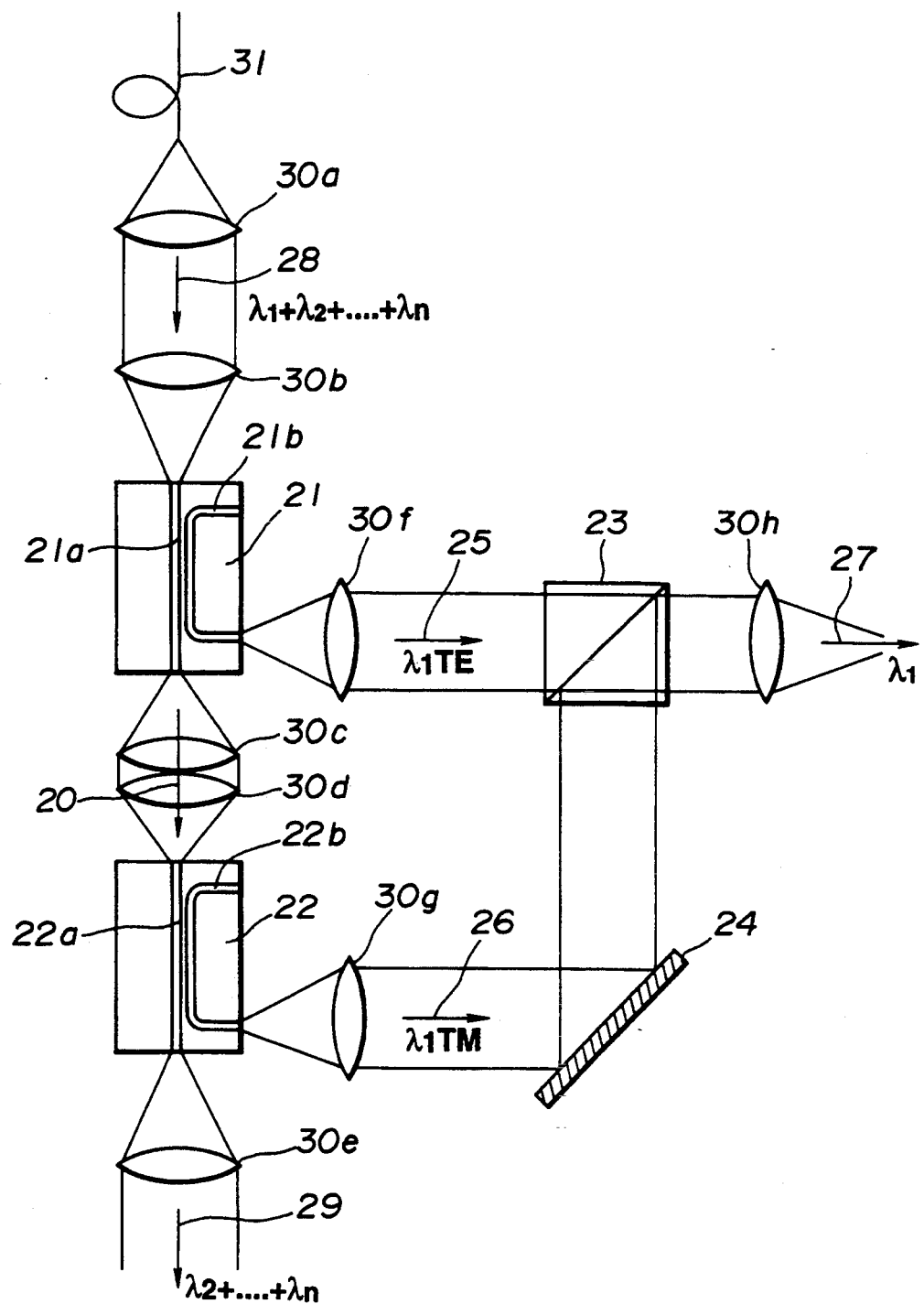
FIG. 4 is a schematic diagram illustrating a first embodiment of the present invention.

In FIG. 4, reference numeral 24 designates a total reflection mirror, reference numerals 30a and 30b designate a lens optical system for effectively coupling an input light beam input 28 to the demultiplexing device 21, reference numerals 30c and 30d designate a lens optical system for effectively coupling a light beam 20 emitted from the demultiplexing device 21 to the demultiplexing device 22 without any change in the polarization state, reference numeral 30e designates a lens optical system for effectively coupling an output light beam 29 emitted from the demultiplexing device 22 to a next stage device, reference numeral 30f designates a lens optical system for guiding the $\lambda_1$TE light beam 25 demultiplexed by the demultiplexing device 21 to the polarization beam splitter 23, reference numeral 30g designates a lens optical system for guiding the $\lambda_1$TM light beam 26 demultiplexed by the demultiplexing device 22 to the polarization beam splitter 23 through the total reflection mirror 24, reference numeral 30h designates a lens optical system for condensing the demultiplexed output light beam 27 from the polarization beam splitter 23, and reference numeral 31 designates an optical fiber used for light beam transmission.

Non-selected wavelength components other than the $\lambda_1$ component are transmitted through the demultiplexer devices 21 and 22 with little crosstalk and are output as the transmitted light beam 29. By providing a similar demultiplexing structure in addition to the structure described above, the additional demultiplexing structure can further demultiplex a component of the transmitted light beam 29 at another wavelength (for example, $\lambda_2$).

In this embodiment, transmission of light between the elements described above is performed by lenses, but other coupling means, such as optical fibers, may be used. Also in this case, it is critical that predetermined directions of polarization states at the input and output of the demultiplexing devices 21 and 22 be aligned with each other (i.e., planes of the waveguides 21a and 22a are coincident with each other) and that no fluctuation in the polarization state occurs between the demultiplexing devices 21 and 22. Moreover, constructions and coupling lengths of the waveguides 21a and 21b; 22a and 22b in the demultiplexers 21 and 22 (for example, directional couplers) are adjusted so that effective demultiplexing selection with little crosstalk can be achieved for two polarization modes, which are perpendicular to each other, and at the predetermined wavelength $\lambda_1$. In other words, propagation constants of the waveguides 21a and 21b in the demultiplexing device 21 are set equal to each other for the TE mode and wavelength $\lambda_1$, while propagation constants of the waveguides 22a and 22b in the demultiplexing device 22 are set equal to each other for the TM mode and wavelength $\lambda_1$.

Although the embodiment shown in FIG. 4 does not illustrate an explicit connection between the waveguide pairs 21a and 21b and 22a and 22b, it should be understood that light travelling through the waveguides 21a and 22a enters waveguides 21b and 22b, respectively, by means well-known in the art. A similar understanding applies to waveguides 40a, 40b and 40c of FIG. 5; 60a, 60b and 60c of FIG. 6; and 80a, 80b and 80c of FIG. 7.

Second Embodiment

Figure 5:
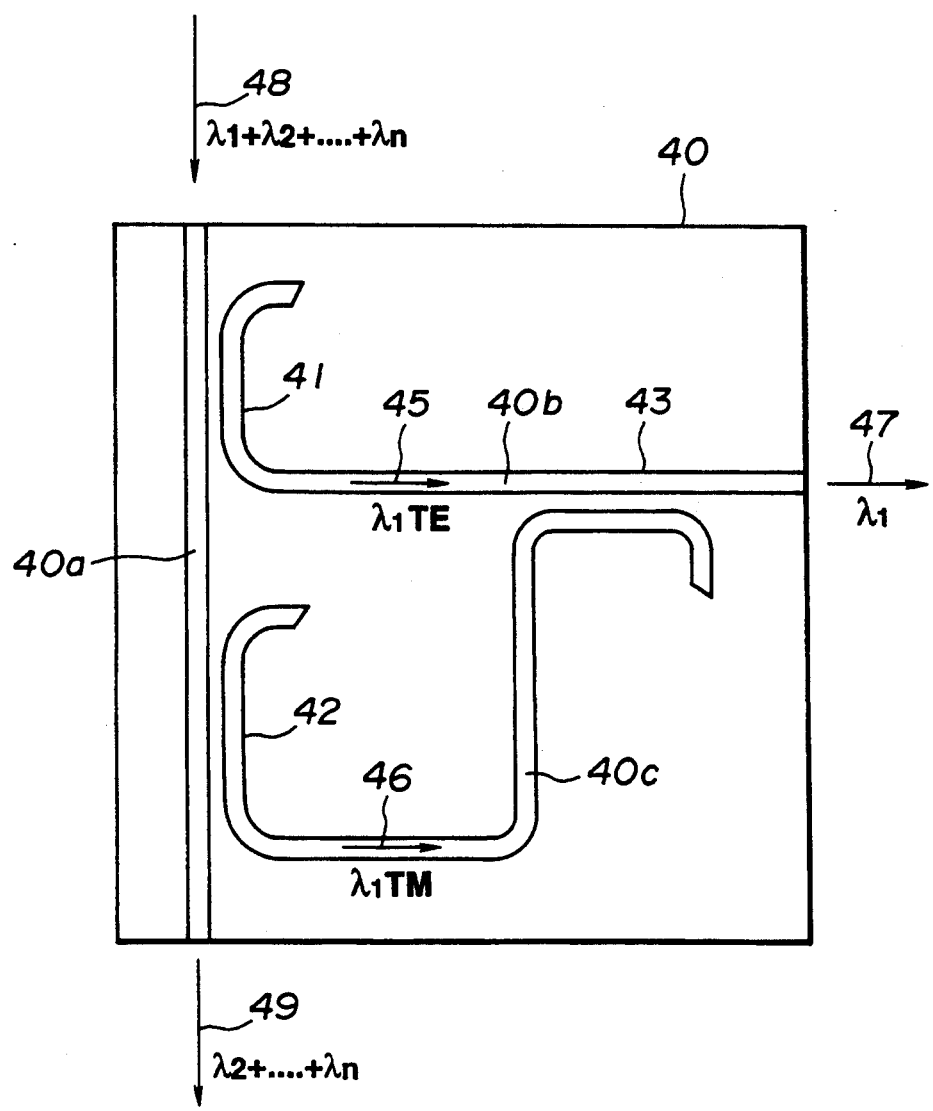
FIG. 5 is a schematic diagram illustrating a second embodiment of the present invention, which is a monolithic demultiplexing device wherein a plurality of directional coupler-type demultiplexers are arranged in a multi-stage or serial form.

A second embodiment of a demultiplexing device according to the present invention will be described with reference to FIG. 5. The second embodiment also adopts the first fundamental construction shown in FIG. 3.

An entire structure of the second embodiment is disposed on a common substrate 40 in a monolithic manner. Demultiplexers 41 and 42 are directional coupler-type devices, similar to the first embodiment, and respectively have characteristics for demultiplexing the TE and TM mode components of light beam 48 at wavelength $\lambda_1$. A polarization multiplexing device 43 multiplexes the TE mode demultiplexed light beam 45 having a wavelength $\lambda_1$ propagated in a channel-type waveguide 40b and the TM mode demultiplexed light beam 46 having a wavelength $\lambda_1$ propagated in a channel-type waveguide 40c, which are respectively demultiplexed from input light beam 48 input into a channel-type waveguide 40a. Those demultiplexed components are output from the waveguide 40b as demultiplexed light beam 47 at wavelength $\lambda_1$.

Light waves other than the selected wavelength $\lambda_1$ are transmitted without any change, and are output from the waveguide 40a as transmitted light beam 49. The polarization multiplexing device 43 only needs to have characteristics for achieving a complete coupling of light wave 46 of TM mode and wavelength $\lambda_1$ and a transmission without any change of light wave 45 of TE mode and wavelength $\lambda_1$. Its basic function is the same as that of the demultiplexer 42.

Non-selected wavelength components other than the $\lambda_1$ component are transmitted through the demultiplexers 41 and 42 and output as the transmitted light beam 49. Similar to the first embodiment, it is possible, when necessary, to provide a similar demultiplexing structure in addition to the structure described above to further demultiplex the transmitted light beam 49 at another wavelength (for example, $\lambda_2$).

Moreover, constructions and coupling lengths of the waveguides 40a and 40b; 40a and 40c in the directional couplers 41 and 42 are adjusted so that effective demultiplexing selection with little crosstalk can be achieved for two polarization modes, which are perpendicular to each other, and at the predetermined wavelength $\lambda_1$.

Third Embodiment

Figure 6:
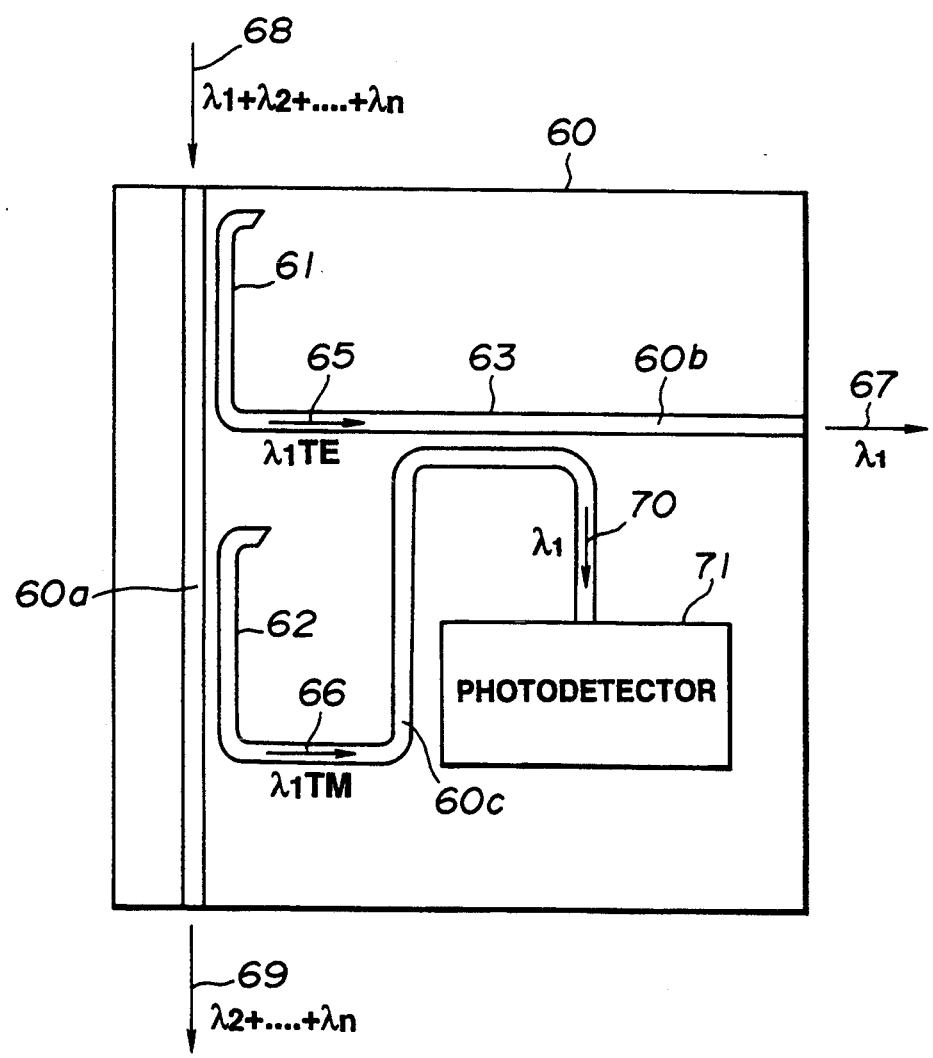
FIG. 6 is a schematic diagram illustrating a third embodiment of the present invention, wherein a portion of a demultiplexed output light is detected by a photodetector.

A third embodiment of a demultiplexing device according to the present invention will be described with reference to FIG. 6. The third embodiment also adopts the first fundamental construction shown in FIG. 3.

In the third embodiment, coupling at a polarization multiplexing device 63 is controlled so that approximately a 3dB coupling is achieved for both the TE and TM modes without performing a complete coupling. A demultiplexed output light beam is branched into a portion 67 and a portion 70, and one light beam wave 70 at wavelength $\lambda_1$ is received by a photodetector 71 arranged on a substrate 60 while the other light beam wave 67 at wavelength $\lambda_1$ is output as a demultiplexed light output.

Also in the third embodiment, an entire structure is disposed on the common substrate 60 in a monolithic manner. Demultiplexers 61 and 62 are directional coupler-type devices, similar to the first embodiment, and respectively have characteristics for demultiplexing the TE and TM modes at wavelength $\lambda_1$. The polarization multiplexing device 63 multiplexes, in the manner described above, demultiplexed light beam 65 of TE mode and wavelength $\lambda_1$ propagated in a channel-type waveguide 60b and demultiplexed light beam 66 of TM mode and wavelength $\lambda_1$ propagated in a channel-type waveguide 60c, which are respectively demultiplexed from input light beam 68 input into a channel-type waveguide 60a. Light waves other than the selected wavelength $\lambda_1$ are transmitted without any change, and are output from the waveguide 60a as transmitted light beam 69.

Although the operation of the polarization multiplexing device 63 is set so that a 3dB coupling is achieved for both the TE and TM modes in this embodiment, one of the polarized light beams 65 and 66 may be completely coupled and thus a demultiplexed component may comprise one of the demultiplexed light beam outputs 67 and 70.

A signal detected by the photodetector 71 may, for example, be used as a feedback signal for controlling the demultiplexing performances of the demultiplexers 61 and 62 through electrodes formed thereon.

Fourth Embodiment

Figure 7:
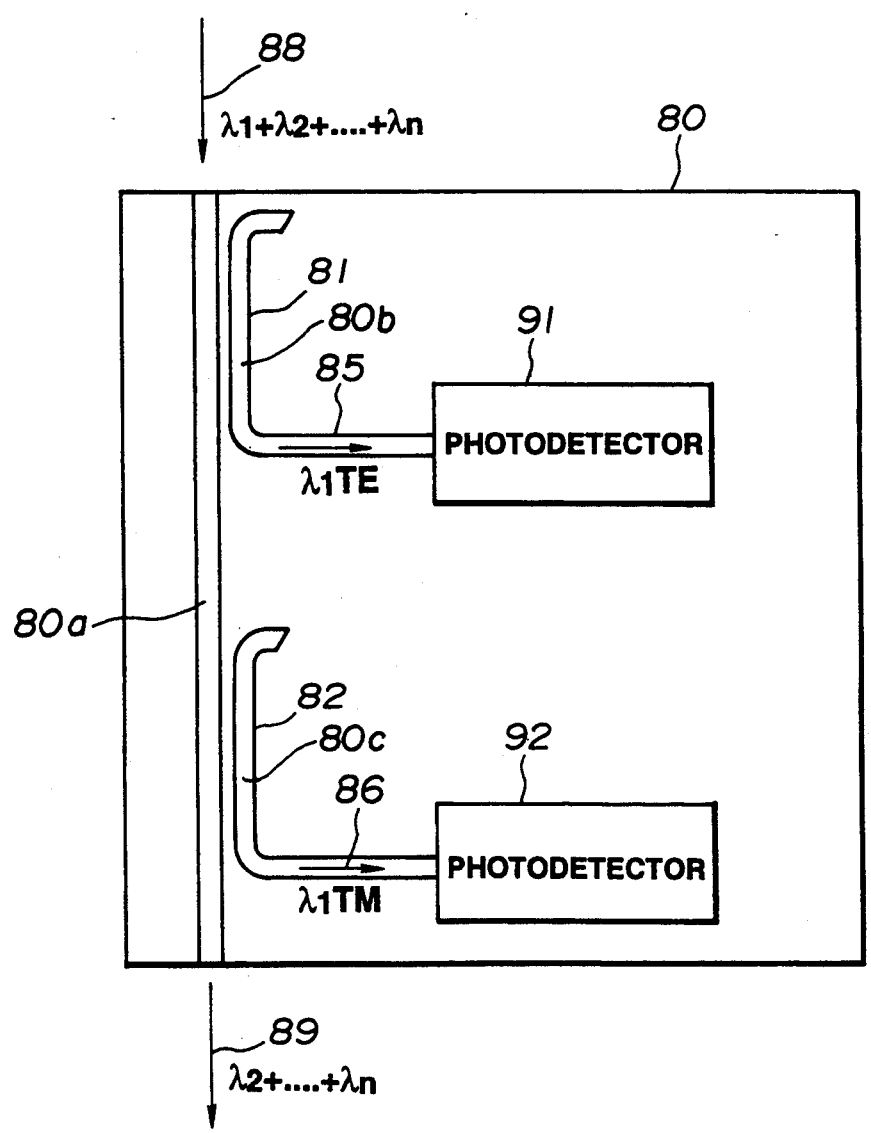
FIG. 7 is a schematic diagram illustrating a fourth embodiment of the present invention, wherein demultiplexed TE and TM mode components are separately detected.

A fourth embodiment of a demultiplexing device according to the present invention will be described with reference to FIG. 7. The fourth embodiment also adopts the first fundamental construction shown in FIG. 3.

In the fourth embodiment, demultiplexed light beams 85 and 86 from respective demultiplexers 81 and 82 are respectively propagated through waveguides 80b and 80c and are separately detected by photodetectors 91 and 92 formed on a common substrate 80.

In the fourth embodiment, an input polarization state at a predetermined selection wavelength $\lambda_1$ of an input light beam 88 can be determined from signals detected by the two photodetectors 91 and 92, and a signal for controlling the polarization state of the input light beam 88 can be obtained. Further, it is possible that electrical signals obtained by photoelectric conversions in the photodetectors 91 and 92 are electrically added and are output as a signal of wavelength $\lambda_1$. Light waves other than a light wave at the selected wavelength $\lambda_1$ are transmitted without any change and output from a waveguide 80a as a transmitted light beam 89.

Fifth Embodiment

Figure 8:
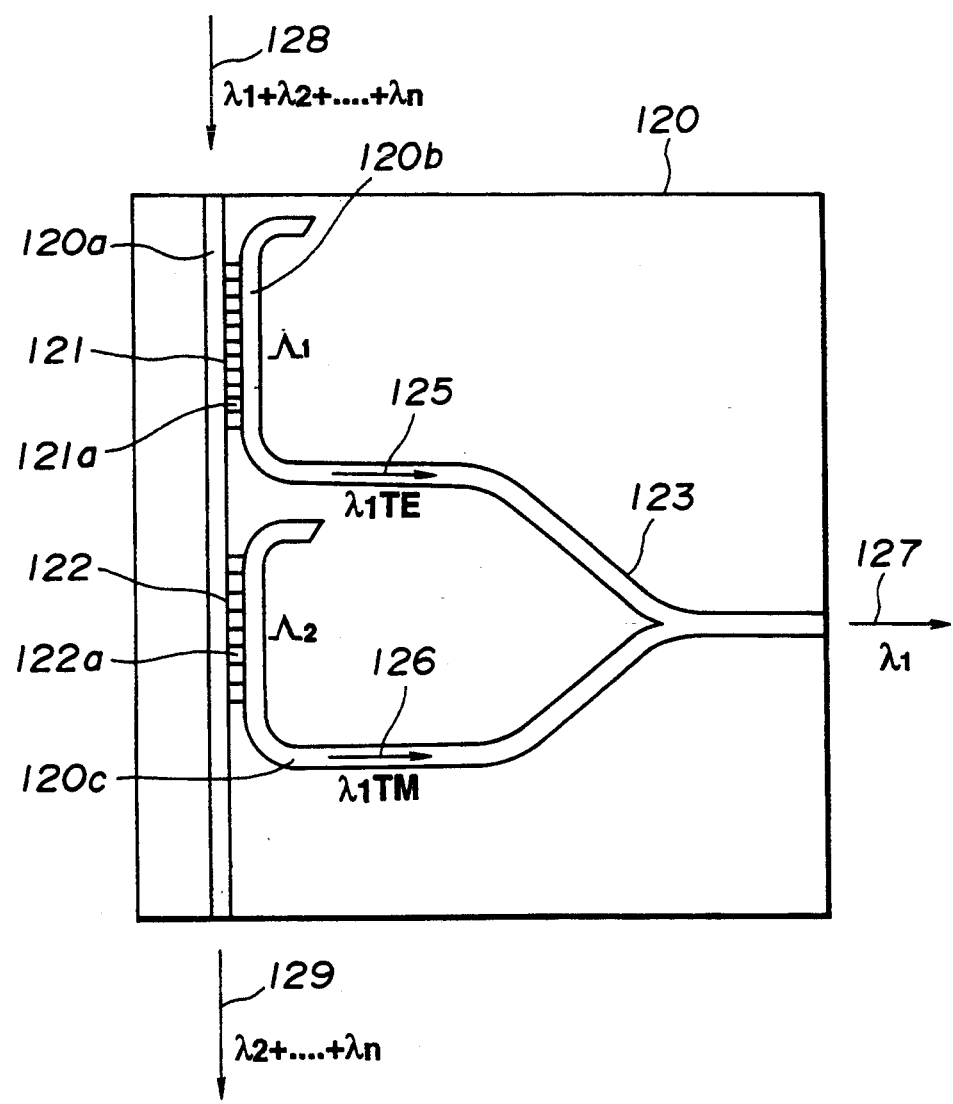
FIG. 8 is a schematic diagram illustrating a fifth embodiment of the present invention, wherein a grating compensation-type directional coupler, serving as a demultiplexer, is combined with a Y-branching device.

A fifth embodiment of a demultiplexing device according to the present invention will be described with reference to FIG. 8. The fifth embodiment also adopts the first fundamental construction shown in FIG. 3.

In the fifth embodiment, in order to sharpen the wavelength selectivity of directional coupler-type demultiplexers 121 and 122, propagation constants of two sets of waveguides 120a and 120b; 120a and 120c are respectively differentiated from each other, and gratings 121a and 122a respectively compensate for the differences in both of those propagation constants for TE and TM polarization modes and wavelength $\lambda_1$. Since grating compensation-type demultiplexing devices 121 and 122 (for example, directional couplers) are adopted, crosstalk at the demultiplexers 121 and 122 is further reduced.

Mode selection demultiplexing corresponding to the combination of polarization mode and wavelength is determined by the waveguide constructions of the demultiplexers 121 and 122 and pitches $\Lambda_1$ and $\Lambda_2$ of the gratings 121a and 122a, respectively, formed for propagation constant compensation. In FIG. 8, the grating 121a of pitch $\Lambda_1$ is formed for demultiplexing the TE mode component at wavelength $\lambda_1$ and the grating 122a of pitch $\Lambda_2$ is formed for demultiplexing the TM mode component at wavelength $\lambda_1$. Further, their coupling lengths are set to the coupling lengths necessary for demultiplexing their respective selection modes and wavelength $\lambda_1$.

In the fifth embodiment, light beam 125 of TE mode and wavelength $\lambda_1$ and light beam 126 of TM mode and wavelength $\lambda_1$, both demultiplexed from an input light beam 128, are combined by a Y-branching device 123 which is a simple combining device (not a multiplexing device), and those combined light beams 125 and 126 are output from a light waveguide as a demultiplexed light beam 127 at wavelength $\lambda_1$. Light waves other than the selected wavelength $\lambda_1$ are transmitted without any change, and are output from the waveguide 120a as a transmitted light beam 129. The Y-branching device 123 generally has a loss of 3dB, and hence the insertion loss increases, compared to an ordinary multiplexer. The structure, however, becomes simple when the Y-branching device 123 is used on a substrate 120. The branching device 123 may be replaced by a polarization multiplexer which comprises a grating compensation-type directional coupler or the like.

Sixth Embodiment

Figure 9:
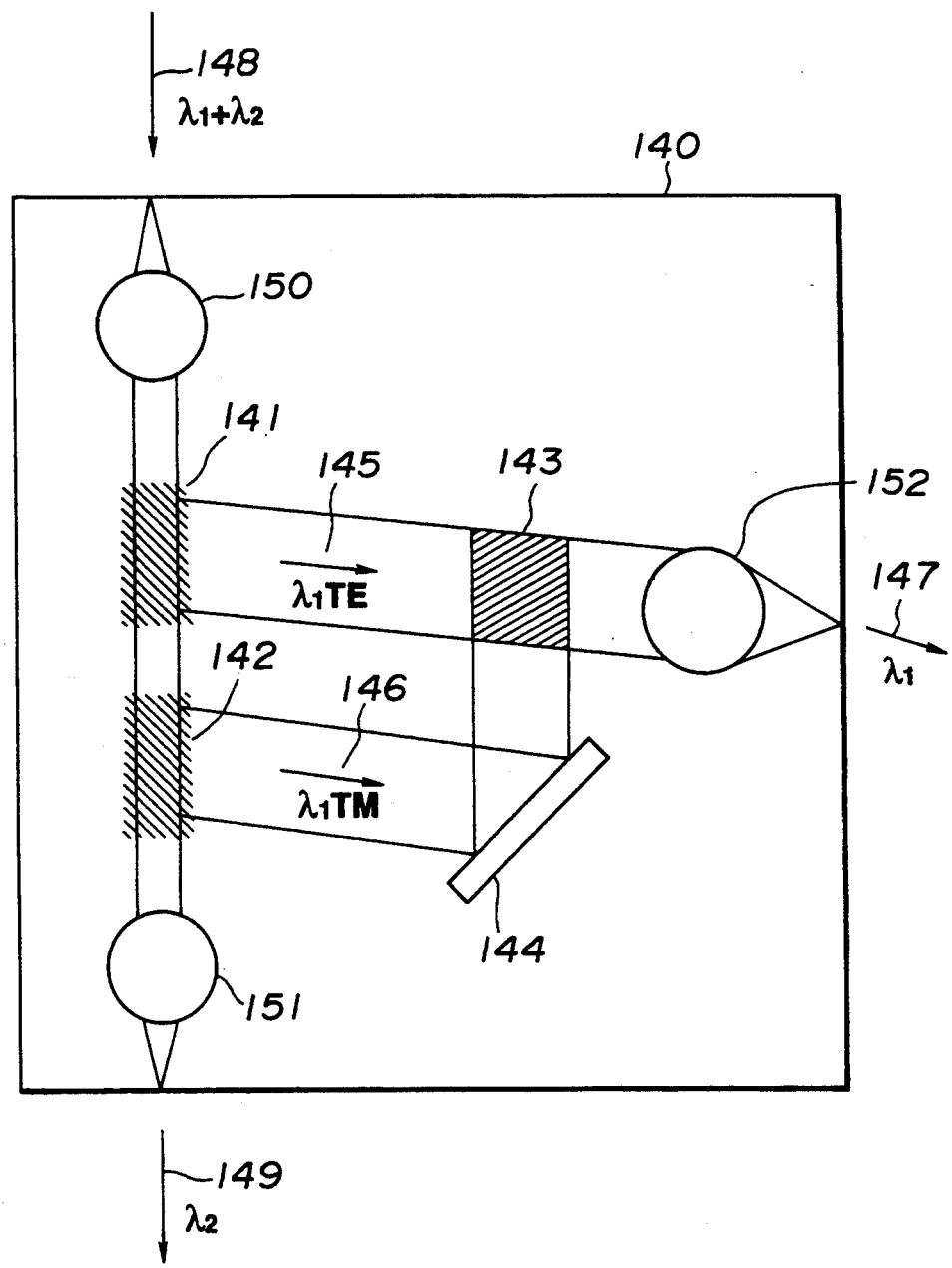
FIG. 9 is a schematic diagram illustrating a sixth embodiment of the present invention, wherein a plurality of grating demultiplexers are arranged in a slab waveguide.

A sixth embodiment of a demultiplexing device according to the present invention will be described with reference to FIG. 9. The sixth embodiment also adopts the first fundamental construction shown in FIG. 3.

In the sixth embodiment, grating demultiplexers 141 and 142 are used as a demultiplexing device. Further, a grating multiplexer 143 is similarly used as a polarization multiplexing device. The grating demultiplexers 141 and 142 are respectively formed so that a light component of desired polarization mode and wavelength is selectively diffracted. In FIG. 9, reference numeral 140 designates a waveguide substrate, and a slab waveguide is formed on the entire surface of the substrate 140.

An incident light beam 148 is condensed on an end surface by a lens (not shown) or the like, and is coupled to a slab propagation light beam. The coupled-slab propagation light beam is collimated by a waveguide lens 150, and a TE mode light beam component 145 of a desired wavelength $\lambda_1$ is demultiplexed therefrom by the grating demultiplexer 141. Furthermore, a TM mode light beam component 146 of wavelength $\lambda_1$ is demultiplexed by the grating demultiplexer 142. A light component at wavelength $\lambda_2$ other than the wavelength $\lambda_1$ is transmitted completely through the demultiplexing devices, and is condensed on another end surface thereof by another waveguide lens 151. Thus, a transmitted output light beam 149, which contains the light beam component at wavelength $\lambda_2$, is obtained.

The demultiplexed TE and TM mode light beam components 145 and 146 of wavelength $\lambda_1$ are multiplexed by the grating multiplexer 143. The multiplexed light beam is condensed on the other end surface of the demultiplexing device by a waveguide lens 152. Thus, an output light beam 147 of wavelength $\lambda_1$ can be obtained. A total reflection mirror 144 is formed on a portion of the light path in the slab waveguide to superimpose the demultiplexed light waves at the grating multiplexer 143.

A concave-shaped lens, such as a Geodesic lens, can be used as the waveguide lenses 150, 151 and 152. A Fresnel lens and a Luneburg lens may also be used.

Seventh Embodiment

Figure 10:
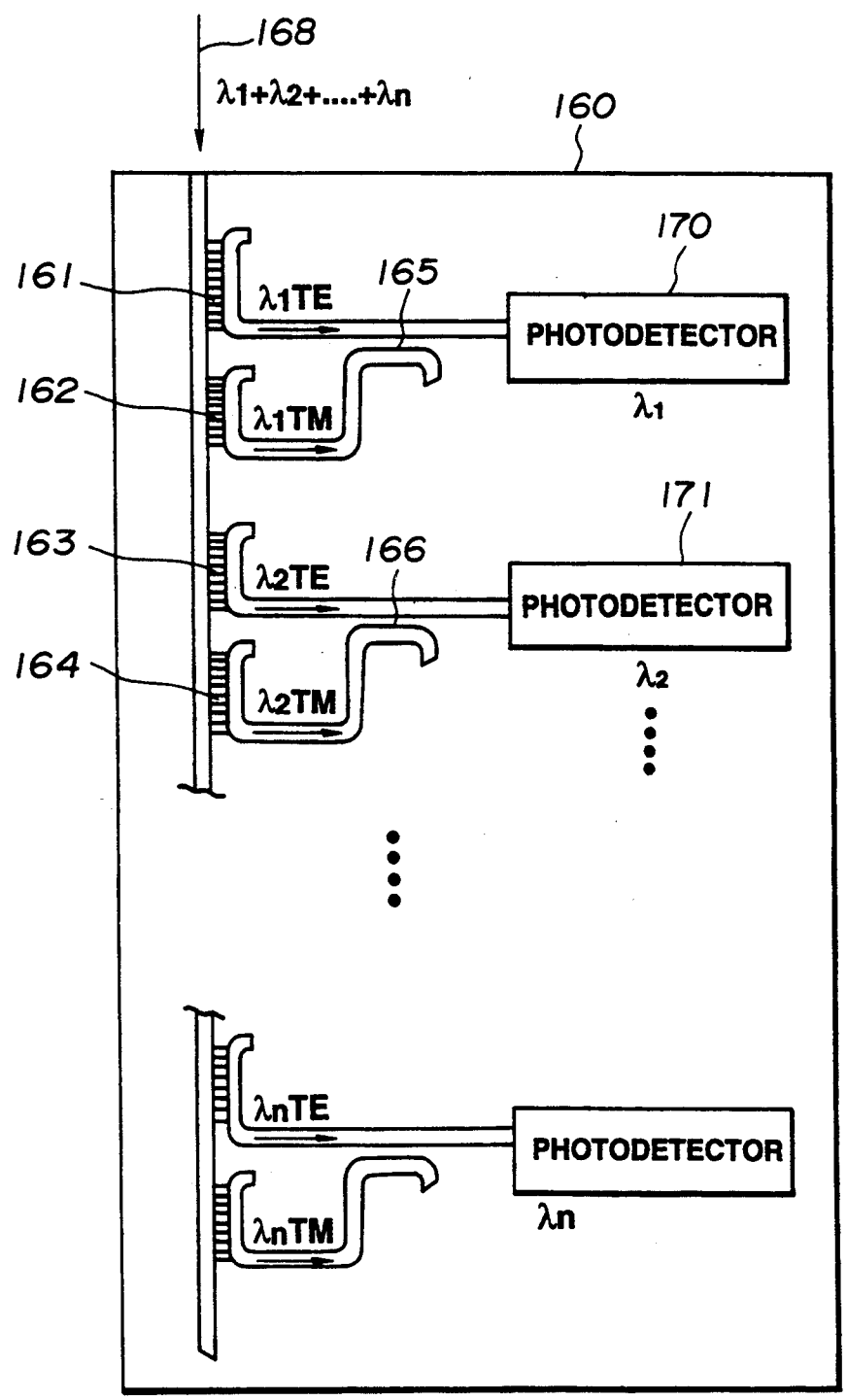
FIG. 10 is a schematic diagram illustrating a seventh embodiment of the present invention, wherein fundamental structures are monolithically arranged for achieving a multi-wavelength demultiplexing detection.

A seventh embodiment of a demultiplexing device according to the present invention will be described with reference to FIG. 10. The seventh embodiment also adopts the first fundamental construction shown in FIG. 3.

In the seventh embodiment, a plurality of polarization-independent demultiplexing devices of the present invention are serially connected in a multi-stage manner, so that wavelength-multiplexed light beams 168 can be demultiplexed and detected. For example, a first stage includes a demultiplexer 161 for demultiplexing a TE mode component of wavelength $\lambda_1$ of input light beams 168, a demultiplexer 162 for demultiplexing a TM mode component of wavelength $\lambda_1$ of input light beams 168 and a TE/TM mode multiplexer 165 which is a polarization multiplexer and which multiplexes the demultiplexed TE and TM mode light beam components of wavelength $\lambda_1$. An entire multiplexed output of wavelength $\lambda_1$ is then converted to an electrical signal by a photodetector 170 provided on a common substrate 160 at the first stage of the seventh embodiment.

A second stage of the seventh embodiment includes a demultiplexer 163 for demultiplexing a TE mode component of wavelength $\lambda_2$ of input light beams 168, a demultiplexer 164 for demultiplexing a TM mode component of wavelength $\lambda_2$ of input light beams 168, and a TE/TM mode multiplexer 166 which is also a polarization multiplexer and which multiplexes the demultiplexed TE and TM mode light beam components of wavelength $\lambda_2$. An entire multiplexed output of wavelength $\lambda_2$ is then converted to an electrical signal by a photodetector 171 provided on the substrate 160 at the second stage of the seventh embodiment. At succeeding stages, similar processes are performed and the demultiplexing detection is achieved by respective devices provided on the substrate 160 at respective stages.

In the seventh embodiment, the demultiplexers 161, 162, 163, 164, . . . respectively comprise grating compensation-type demultiplexing devices (for example, directional couplers) as described in the fifth embodiment.

Eighth Embodiment

Figure 11:
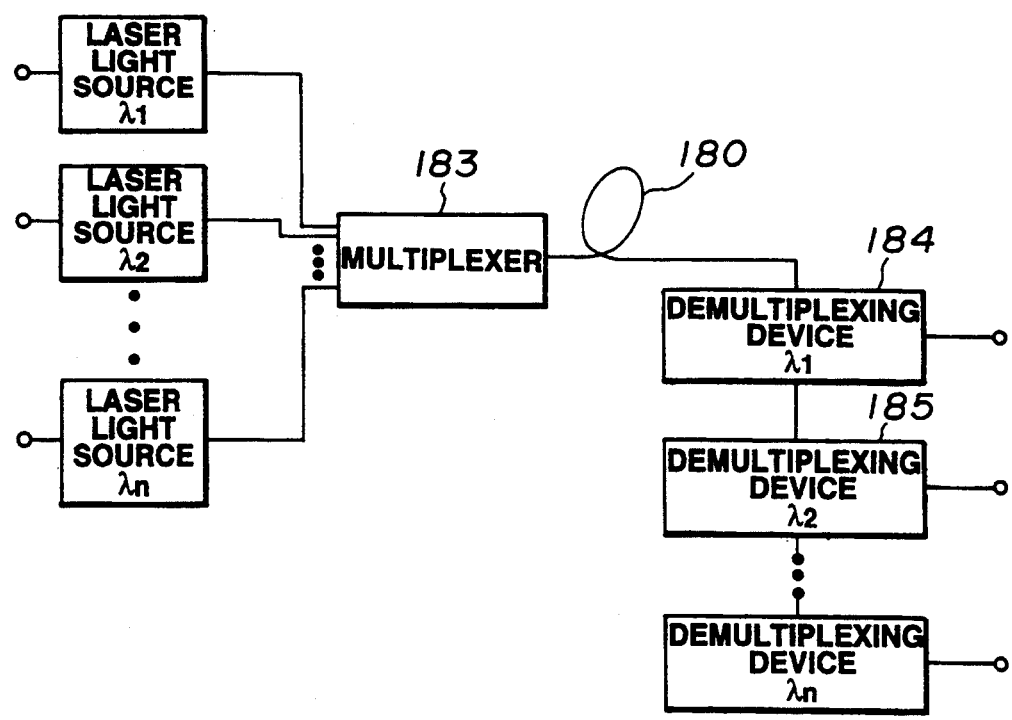
FIG. 11 is a schematic diagram illustrating an eighth embodiment of the present invention, which is directed to a wavelength division multiplexing transmission system using a demultiplexing device of the present invention.

An eighth embodiment of a wavelength division multiplexing transmission system, which uses a polarization-independent demultiplexing device according to the present invention, will be described with reference to FIG. 11. In the eighth embodiment, laser light sources 181, 182, . . . corresponding to multiplexed wavelengths $\lambda_1, \ldots, \lambda_n$ are provided in a transmitter unit, and those emitted wavelengths are multiplexed by a multiplexer 183. The multiplexer 183 may be replaced by a combining device. The multiplexed light signals are transmitted through an optical fiber 180, and input into a receiver unit. The receiver unit includes multi-stage demultiplexing devices 184, 185, . . . for demultiplexing respective wavelengths $\lambda_1, \ldots, \lambda_n$ in a polarization-independent manner, and hence a signal of desired wavelength can be obtained at each stage.

In the eighth embodiment, stable wavelength division multiplexed transmission can be achieved even if fluctuations in polarization state at respective wavelengths occur at the respective stages and during light transmission, because the demultiplexing devices 184, 185, . . . have polarization-independent characteristics.

Ninth Embodiment

A ninth embodiment of a demultiplexing device according to the present invention will be described with reference to FIGS. 12 and 13.

Figure 12:
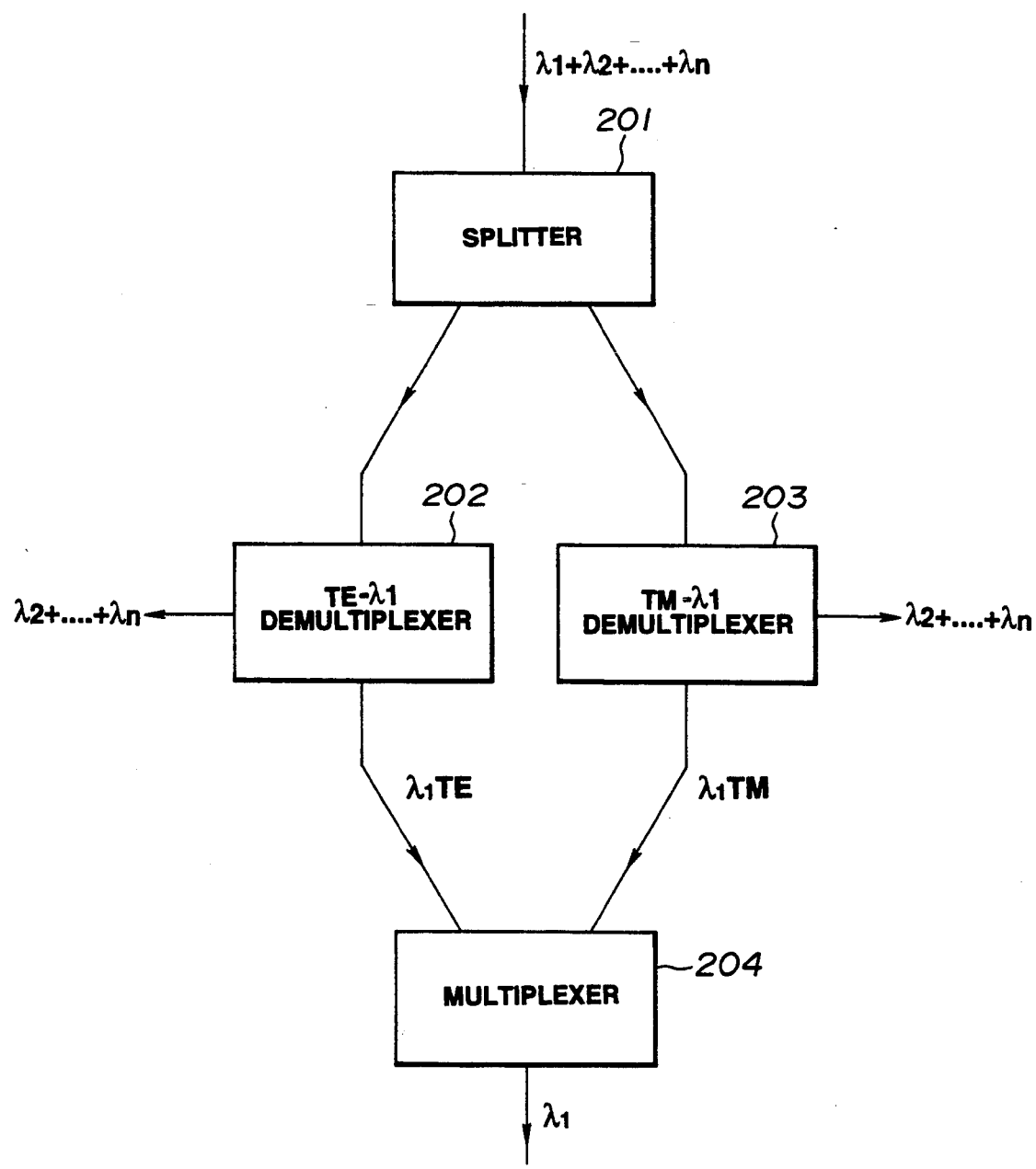
FIG. 12 is a block diagram illustrating a second fundamental concept of the present invention (a parallel system).

FIG. 12 shows a second fundamental construction of a polarization-independent demultiplexing device of the present invention. While TE and TM mode demultiplexers are arranged in a serial or cascade manner in the first fundamental construction as illustrated in FIG. 3, in the second fundamental construction, for example, an input light beam is initially power-branched or polarization-demultiplexed (i.e., demultiplexing in accordance with the polarization state) and the branched light portions are respectively input into TE and TM mode demultiplexers. Further, the demultiplexed light beam portions $\lambda_1$TE and $\lambda_1$TM are combined or multiplexed. Thus, the second fundamental construction adopts a parallel arrangement. In FIG. 12, an incident light beam containing wavelengths $\lambda_1$ and $\lambda_2$ is power-branched by a splitter 201 and the branched light portions are respectively input into TE-$\lambda_1$ and TM-$\lambda_1$ demultiplexers 202 and 203. The TE-$\lambda_1$ and TM-$\lambda_1$ demultiplexers 202 and 203 respectively demultiplex and output $\lambda_1$TE (a component of TE mode and wavelength $\lambda_1$) and $\lambda_1$TM (a component of TM mode and wavelength $\lambda_1$) light waves. The demultiplexed light waves are multiplexed or combined by a multiplexer or combining device 204, and thus an output light beam of wavelength $\lambda_1$ is obtained. When the power-branching and then the light-combining are performed, losses will slightly increase, as compared with a case where the polarization-demultiplexing and then the multiplexing are performed.

Figure 13:
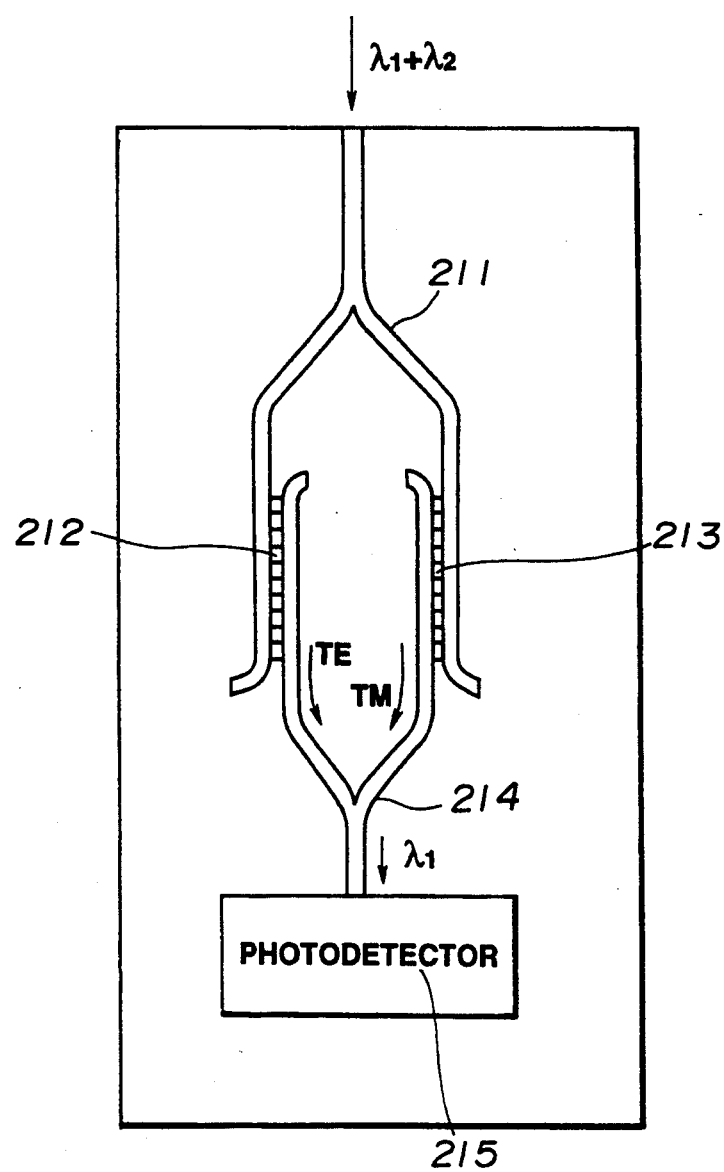
FIG. 13 is a schematic diagram illustrating a ninth embodiment of the present invention, wherein a branching device is arranged at an input stage and demultiplexers for respectively demultiplexing mutually perpendicular polarization modes are parallelly arranged.

The ninth embodiment shown in FIG. 13 is directed to an integrated device which has the second fundamental construction shown in FIG. 12. As shown in FIG. 13, in the ninth embodiment, Y-branching devices respectively serve as a splitter 211 and a combining device 214. Grating compensation-type directional couplers 212 and 213 are respectively used as demultiplexers for respectively demultiplexing $\lambda_1$TE and $\lambda_1$TM light beam components. The light wave of wavelength $\lambda_1$, produced by combining the demultiplexed $\lambda_1$TE and $\lambda_1$TM light beam components at the combining device 214, is detected by a photodetector 215 and taken out as a signal output. If the splitter 211 and the combining device 214 are respectively replaced by means for demultiplexing light in accordance with the polarization state (in this case. TE and TM modes), such as a polarization beam splitter, and a multiplexer, the process will be conducted more effectively.

Also in the second fundamental construction, a multi-stage demultiplexing can be achieved for respective wavelengths $\lambda_1, \lambda_2, \ldots, \lambda_n$ comprising the input light beam. In this case, TE-$\lambda_2$ and TM-$\lambda_2$ demultiplexers are respectively connected to output ports of transmitted lights of the TE-$\lambda_1$ and TM-$\lambda_1$ demultiplexers 202 and 203 (FIG. 12) to demultiplex $\lambda_2$TE and $\lambda_2$TM light beam components. Those $\lambda_2$TE and $\lambda_2$TM light beam components are multiplexed by another multiplexer provided at a second stage.

Tenth Embodiment

Figure 14:
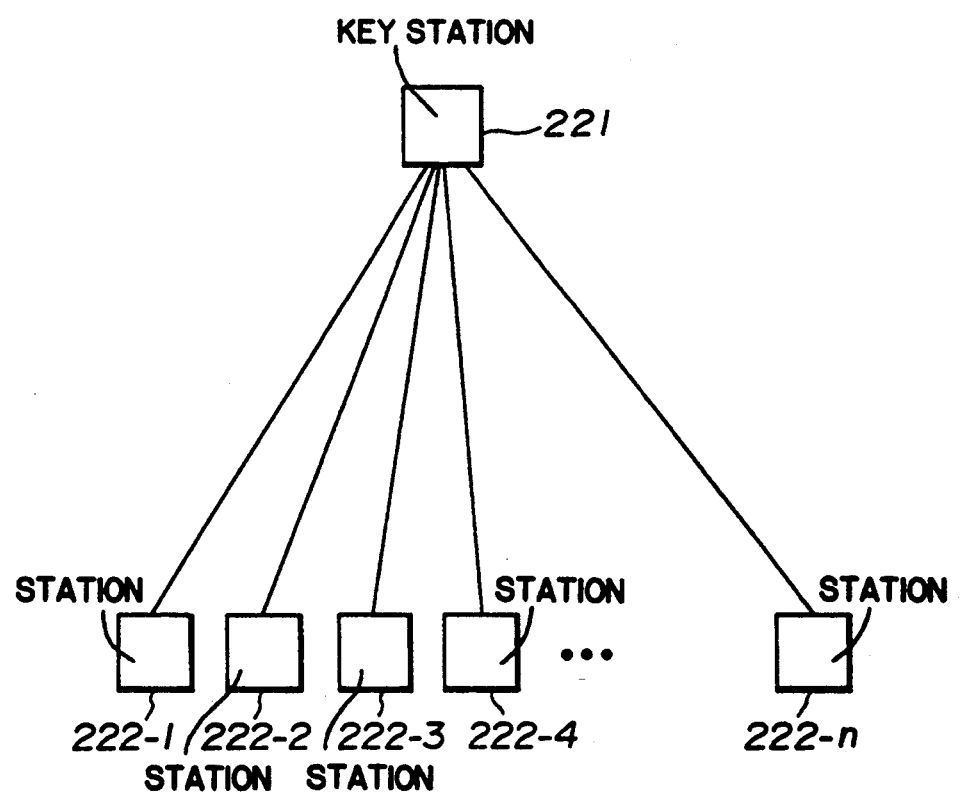
FIG. 14 is a schematic diagram illustrating a tenth embodiment of the present invention, which is directed to a star-type optical local area network (LAN) using a demultiplexing device of the present invention.

FIG. 14 illustrates a configuration of a star-type wavelength division multiplexing transmission system in which the transmission of wavelength-multiplexed light waves and the wavelength demultiplexing receiving processes are performed by offices or stations 222-1~222-n. In FIG. 14, reference numeral 221 designates an office which serves as a key station in the system. The office 221 contains a star coupler for combining and branching signals from the respective offices 222-1~222-n (n to n communication), or an exchanger (one to one communication) or the like. In the respective offices, transmission and receiving are performed through wavelength multiplexing channels given thereto, and a polarization-independent demultiplexing device as described in the above-discussed embodiments is used for each wavelength demultiplexing process. In such a system, fluctuation in the polarization state is considerable because an optical fiber transmission and a star coupler are introduced thereinto. However, stable wavelength division multiplexing transmission is achieved by using the polarization-independent demultiplexing device of the present invention.

As described in the foregoing, according to the present invention, the drawback of a waveguide-type demultiplexer, i.e., a strong polarization dependency, is solved, and excellent demultiplexing performance, which is specific to the waveguide-type demultiplexer, can be achieved. Furthermore, the construction can be made remarkably compact in size due to the integration of devices.

Moreover, in the wavelength division multiplexing transmission, a demultiplexing device for demultiplexing a component of a certain predetermined wavelength of a light beam can be composed of two demultiplexers for demultiplexing light beam components in, for example, two mutually perpendicular polarization states so that a polarization-independent demultiplexing device can be obtained. Thus, despite fluctuations in the polarization state occurring during transmission in an optical fiber, stable wavelength division multiplexing transmission can be achieved without using controlling devices such as a polarization control device.

Except as otherwise disclosed herein, the various components shown in outline or block form in the Figures are individually well-known in optical receiving devices, or demultiplexing devices and optical communication arts, and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. The present invention is intended to cover various modifications and equivalent arrangements included within the sprit and scope of the appended claims.

What is claimed is:

1. A wavelength demultiplexing apparatus for demultiplexing a light beam of at least one predetermined wavelength, said apparatus comprising:
    first demultiplexing means for demultiplexing the light beam at a predetermined wavelength to obtain a component of the light beam in a first polarization state; and
    second demultiplexing means for demultiplexing the light beam at the predetermined wavelength to obtain a component of the light beam in a second polarization state, different from the first polarization state, said second demultiplexing means being optically connected to said first demultiplexing means in a serial manner with respect to light transmitted through said first demultiplexing means.

2. A wavelength demultiplexing apparatus according to claim 1, further comprising input means for inputting the light beam into said first demultiplexing means.

3. A wavelength demultiplexing apparatus according to claim 1, wherein the orientation of the component of the light beam in the first polarization state is perpendicular to the orientation of the component of the light beam in the second polarization state.

4. A wavelength demultiplexing apparatus according to claim 1, further comprising multiplexing means for multiplexing the component of the light beam obtained by said first demultiplexing means and the component of the light beam obtained by said second demultiplexing means.

5. A wavelength demultiplexing apparatus according to claim 4, wherein said multiplexing means comprises a polarization multiplexing device for multiplexing components of the light beam in mutually perpendicular polarization states.

6. A wavelength demultiplexing apparatus according to claim 5, wherein the polarization multiplexing device comprises one of a polarization beam splitter and a polarization beam prism.

7. A wavelength demultiplexing apparatus according to claim 4, further comprising a photodetector for detecting at least part of the light multiplexed by said multiplexing means.

8. A wavelength demultiplexing apparatus according to claim 1, further comprising combining means for combining the component of the light beam obtained by said first demultiplexing means and the component of the light beam obtained by said second demultiplexing means.

9. A wavelength demultiplexing apparatus according to claim 8, further comprising a photodetector for detecting at least part of the light combined by said combining means.

10. A wavelength demultiplexing apparatus according to claim 1, wherein the first polarization state is a transverse electric mode and the second polarization state is a transverse magnetic mode.

11. A wavelength demultiplexing apparatus according to claim 1, wherein said first and second demultiplexing means respectively comprise waveguide-type demultiplexers.

12. A wavelength demultiplexing apparatus according to claim 11, wherein said waveguide-type multiplexers respectively comprise polarization-independent wavelength demultiplexing devices.

13. A wavelength demultiplexing apparatus according to claim 12, wherein said waveguide-type demultiplexers respectively comprise directional coupler devices.

14. A wavelength demultiplexing apparatus according to claim 12, wherein said waveguide-type demultiplexers respectively comprise grating compensation-type directional coupler devices.

15. A wavelength demultiplexing apparatus according to claim 12, wherein said waveguide-type demultiplexers respectively comprise waveguide-type deflection grating devices.

16. A wavelength demultiplexing apparatus according to claim 1, further comprising a photodetector for detecting the light component obtained by at least one of said first and second demultiplexing means.

17. A wavelength demultiplexing apparatus according to claim 1, wherein said first demultiplexing means comprises a plurality of first demultiplexing means and said second demultiplexing means comprises a plurality of second demultiplexing means, wherein said plurality of said first and second demultiplexing means are serially arranged with respect to light transmitted through said plurality of first demultiplexing means and said plurality of second demultiplexing means.

18. A wavelength demultiplexing apparatus for demultiplexing a light beam of at least one predetermined wavelength, said apparatus comprising:
  first demultiplexing means for demultiplexing the light beam at a predetermined wavelength to obtain a component of the light beam in a first polarization state; and
  second demultiplexing means for demultiplexing the light beam at the predetermined wavelength to obtain a component of the light beam in a second polarization state, different from the first polarization state, said first demultiplexing means and said second demultiplexing means being arranged in a parallel manner with respect to light transmitted through said first and second demultiplexing means.

19. A wavelength demultiplexing apparatus according to claim 18, further comprising input means for inputting light into said first and second demultiplexing means.

20. A wavelength demultiplexing apparatus according to claim 19, further comprising polarization branching means for causing the light beam from said input means to branch into said first and second demultiplexing means, wherein the light beam in each branch has components in the first and second polarization states.

21. A wavelength demultiplexing apparatus according to claim 19, further comprising power branching means for power-branching the light beam from said input means into two light beams and respectively inputting the two light beams into said first and second demultiplexing means.

22. A wavelength demultiplexing apparatus according to claim 18, wherein the orientation of the component of the light beam in the first polarization state is perpendicular to the orientation of the component of the light beam in the second polarization state.

23. A wavelength demultiplexing apparatus according to claim 18, further comprising multiplexing means for multiplexing the component of the light beam obtained by said first demultiplexing means and the component of the light beam obtained by said second demultiplexing means.

24. A wavelength demultiplexing apparatus according to claim 23, wherein said multiplexing means comprises a polarization multiplexing device for multiplexing components of the light beam in mutually perpendicular polarization states.

25. A wavelength demultiplexing apparatus according to claim 24, wherein the polarization multiplexing device comprises one of a polarization beam splitter and a polarization beam prism.

26. A wavelength demultiplexing apparatus according to claim 23, further comprising a photodetector for detecting at least part of the light multiplexed by said multiplexing means.

27. A wavelength demultiplexing apparatus according to claim 18, further comprising combining means for combining the light component demultiplexed by said first demultiplexing means and the light component demultiplexed by said second demultiplexing means.

28. A wavelength demultiplexing apparatus according to claim 27, further comprising a photodetector for detecting at least part of the light combined by said combining means.

29. A wavelength demultiplexing apparatus according to claim 18, wherein the first polarization state is a transverse electric mode and the second polarization state is a transverse magnetic mode.

30. A wavelength demultiplexing apparatus according to claim 18, wherein said first and second demultiplexing means respectively comprise waveguide-type demultiplexers.

31. A wavelength demultiplexing apparatus according to claim 30, wherein said waveguide-type demultiplexers respectively comprise polarization-independent wavelength demultiplexing devices.

32. A wavelength demultiplexing apparatus according to claim 30, wherein said waveguide-type demultiplexers respectively comprise directional coupler devices.

33. A wavelength demultiplexing apparatus according to claim 30, wherein said waveguide-type demultiplexers respectively comprise grating compensation-type directional coupler devices.

34. A wavelength demultiplexing apparatus according to claim 30, wherein said waveguide-type demultiplexers respectively comprise waveguide-type deflection grating devices.

35. A wavelength demultiplexing apparatus according to claim 18, further comprising a photodetector for detecting the light component obtained by at least one of said first and second demultiplexing means.

36. A wavelength demultiplexing apparatus according to claim 18, wherein said first demultiplexing means comprises a plurality of first demultiplexing means and said second demultiplexing means comprises a plurality of second demultiplexing means, wherein said plurality of said first and second demultiplexing means are serially arranged with respect to light transmitted through said plurality of first demultiplexing means and said plurality of second demultiplexing means.

37. A wavelength division multiplexing communication system for performing wavelength division multiplexing transmission through an optical fiber, said system comprising:
   a transmitter unit; and
   a receiver unit, said receiver unit including a wavelength demultiplexing apparatus for demultiplexing a light beam of at least one predetermined wavelength, and said wavelength demultiplexing apparatus comprising:
      first demultiplexing means for demultiplexing the light beam at a predetermined wavelength to obtain a component of the light beam in a first polarization state and; and
      second demultiplexing means for demultiplexing the light beam at the predetermined wavelength to obtain a component of the light beam in a second polarization state, different from the first polarization state, said second demultiplexing means being optically connected to said first demultiplexing means in a serial manner with respect to light transmitted through said first demultiplexing means.

38. A wavelength division multiplexing communication system for performing wavelength division multiplexing transmission through an optical fiber, said system comprising:
   a transmitter unit; and
   a receiver unit, said receiver unit including a wavelength demultiplexing apparatus for demultiplexing a light beam of at least one predetermined wavelength, and said wavelength demultiplexing apparatus comprising:
      first demultiplexing means for demultiplexing the light beam at a predetermined wavelength to obtain a component of the light beam in a first polarization state; and
      second demultiplexing means for demultiplexing the light beam at the predetermined wavelength to obtain a component of the light beam in a second polarization state, different from the first polarization state, said first demultiplexing means and said second demultiplexing means being arranged in a parallel manner with respect to light transmitted through said first and second demultiplexing means.

39. A wavelength demultiplexing apparatus for demultiplexing a light beam of at least one predetermined wavelength, said apparatus comprising:
   first demultiplexing means for demultiplexing the light beam at a predetermined wavelength to obtain a component of the light beam in a first polarization state; and
   second demultiplexing means for demultiplexing the light beam at the predetermined wavelength to obtain a component of the light beam in a second polarization state, different from the first polarization state.

* * * * *

UNITED STATES PATENT AND TRADEMARK OFFICE
CERTIFICATE OF CORRECTION

PATENT NO. : 5,379,142
DATED : January 3, 1995
INVENTOR(S) : YUICHI HANDA

Page 1 of 2

It is certified that error appears in the above-indentified patent and that said Letters Patent is hereby corrected as shown below:

ON TITLE PAGE

In [56] References Cited, under U.S. PATENT DOCUMENTS, insert: --5,125,050  6/1992  Deri--.

In [56] References Cited, under FOREIGN PATENT DOCUMENTS, insert: --0245165  11/1987  European Pat. Off.
0390002  10/1990  European Pat. Off.
62-124523  6/1987  Japan--.

COLUMN 2

Line 30, "According to one" should read --One--.
Line 51, "means" (second ocurrence) should read --means.--.

COLUMN 3

Line 55, "According to "another" should read --One--.

COLUMN 9

Line 41, "devices," should read --device,--.

COLUMN 13

Line 35, "multiplex-" should read --demultiplex- --.

UNITED STATES PATENT AND TRADEMARK OFFICE
CERTIFICATE OF CORRECTION

PATENT NO. : 5,379,142
DATED : January 3, 1995
INVENTOR(S) : YUICHI HANDA

It is certified that error appears in the above-indentified patent and that said Letters Patent is hereby corrected as shown below:

<u>COLUMN 15</u>

Line 45, "state and; and" should read --state; and--.

Signed and Sealed this

Twenty-fifth Day of July, 1995

Attest:

BRUCE LEHMAN

*Attesting Officer*     *Commissioner of Patents and Trademarks*